US012119718B2

(12) United States Patent
Huang

(10) Patent No.: US 12,119,718 B2
(45) Date of Patent: Oct. 15, 2024

(54) MOTOR FOR ELECTRIC TOOTHBRUSH AND ELECTRIC TOOTHBRUSH HAVING THE SAME

(71) Applicant: Anhui Tongjia Electronic Technology Co., Ltd, Anhui (CN)

(72) Inventor: Jianhui Huang, Bengbu (CN)

(73) Assignee: Anhui Tongjia Electronic Technology Co., Ltd, Bengbu (CN)

( * ) Notice: Subject to any disclaimer, the term of this patent is extended or adjusted under 35 U.S.C. 154(b) by 191 days.

(21) Appl. No.: 17/944,958

(22) Filed: Sep. 14, 2022

(65) Prior Publication Data

US 2023/0078385 A1 Mar. 16, 2023

(30) Foreign Application Priority Data

Sep. 14, 2021 (CN) .......................... 202111083840.5
Sep. 14, 2021 (CN) .......................... 202122251777.3
Jul. 21, 2022 (CN) .......................... 202221928605.3

(51) Int. Cl.
*H02K 33/00* (2006.01)
*A46B 9/04* (2006.01)
*A46B 13/02* (2006.01)
*A61C 17/34* (2006.01)
*H02K 7/00* (2006.01)
*H02K 7/08* (2006.01)
*H02K 16/02* (2006.01)

(52) U.S. Cl.
CPC ................ *H02K 16/02* (2013.01); *A46B 9/04* (2013.01); *A46B 13/02* (2013.01); *A61C 17/34* (2013.01); *H02K 7/003* (2013.01); *H02K 7/08* (2013.01)

(58) Field of Classification Search
CPC ........ H02K 1/2786; H02K 1/34; H02K 7/003; H02K 7/08; H02K 16/02; H02K 33/00; H02K 33/12; H02K 33/18; A61C 17/34
See application file for complete search history.

(56) References Cited

FOREIGN PATENT DOCUMENTS

CN 214959111 U * 11/2021

* cited by examiner

*Primary Examiner* — Ramon M Barrera

(57) ABSTRACT

Provided are a motor for an electric toothbrush and an electric toothbrush having the same. The motor includes a housing and at least one pair of rotor iron core groups fixed within the housing, wherein each rotor iron core group is formed by stacking a plurality of rotor iron cores, each of the plurality of rotor iron cores includes an iron core main body portion and an iron core convex portion protruding outwards from the periphery of the iron core main body portion; and at least one pair of rotor iron core groups are inserted into two axially extending iron core brackets, and the two iron core brackets are each provided with a clamping groove, with the clamping grooves having openings opposite to each other.

20 Claims, 6 Drawing Sheets

MOTOR FOR ELECTRIC TOOTHBRUSH AND ELECTRIC TOOTHBRUSH HAVING THE SAME

CROSS-REFERENCE TO RELATED APPLICATION

The present disclosure claims the priority to the Chinese patent application with the filing No. 2021110838405 filed with the Chinese Patent Office on Sep. 14, 2021 and entitled "Motor for Electric Toothbrush and Electric Toothbrush Having the Same", the Chinese patent application with the filing No. 2021222517773 filed with the Chinese Patent Office on Sep. 14, 2021 and entitled "Motor for Electric Toothbrush and Electric Toothbrush Having the Same", and the Chinese patent application with the filing No. 2022219286053 filed with the Chinese Patent Office on Jul. 21, 2022 and entitled "Motor for Electric Toothbrush and Electric Toothbrush", the contents of which are incorporated herein by reference in entirety.

TECHNICAL FIELD

The present disclosure relates to the technical field of motors, particularly to a motor for an electric toothbrush and an electric toothbrush having the motor for the electric toothbrush.

BACKGROUND ART

The electric toothbrush makes the brush head generate high-frequency vibration by means of rapid operation of the motor, and instantly decomposes toothpaste into fine foams to deeply clean slits between teeth; meanwhile, vibration of bristles on the brush head can promote blood circulation of the oral cavity, and has a certain massage effect on gum tissues. Thus, the motor is a major component of the electric toothbrush. Currently, the electric toothbrushes have the following requirements for the motors: the motor shaft can swing left and right at very high frequency (200-400 Hz) and a tiny angle (not more than ±15°) in the vicinity of a central balance point, so as to drive the brush head to swing fast to clean the teeth.

In order to realize the left-right swing of the brush head, besides a driving force for sudden left and right change, a restoring force for restoring to the center is also required. The motors for an electric toothbrush in the prior art generally generate the driving force for sudden left and right change through interaction between magnetic steel and coil. The coil can generate an alternating driving force when applied with an alternating current. Most structure for the restoring force is a spring, but such structure is easy to damage and difficult to repair, then the service lifetime of the motor for an electric toothbrush is relatively short. Based on this, a motor for an electric toothbrush, in which the restoring force is generated by magnetic interaction between magnetic steel and a rotor iron core, is provided in the market, without mechanical loss of magnetic action, which has a significant advantage over the motors providing the restoring force by a spring.

Some prior motors for an electric toothbrush have the following drawbacks: (1) a stator iron core and a shell are of an integrated structure, i.e., two poles of the stator iron core are of an integrated structure and are connected through the shell, wherein this structure enables, due to the processing limit, the shell located outside the stator iron core to have the minimum wall thickness, while this minimum wall thickness is unnecessary from the perspective of magnetic conductivity, so that the space occupied by the coil winding is reduced, i.e., the number of turns of the coil winding is limited, further reducing the performance of a motor device, particularly a motor with a smaller dimension; and (2) the magnetic steel and the motor shaft are connected with each other by the rotor iron core, then the rotor iron core will occupy a certain space, so that the space occupied by the magnetic steel is relatively reduced, and the volume of the rotor iron core itself cannot be made larger, further reducing the performance of the motor device.

In some motors for an electric toothbrush in the prior art, two adjacent stator iron cores need to be fixed by a stator support, and as adjacent side portions of the two stator iron cores are respectively provided with a stator support, fixation in place is difficult to realize at one time during actual assembling, causing the problem of low assembling efficiency.

In addition, in actual use of some prior art electric toothbrushes, an iron core bracket with a clamping groove easily scratches and rubes the coil winding to cause damage; in the operation in the prior art, a wire head and a wire tail of a motor coil are generally tin-dipped first, then the wire is arranged, after that, a connection part thereof is tucked in a cavity at an end portion of the iron core bracket. Such operation is time-consuming and labor-consuming, and easily causes damage to tin-dipped portions in the wire tucking process.

SUMMARY

An embodiment of the present disclosure provides a motor for an electric toothbrush, including a housing and at least one pair of rotor iron core groups fixed within the housing, wherein each rotor iron core group is formed by stacking a plurality of rotor iron cores, each of the plurality of rotor iron cores includes an iron core main body portion and an iron core convex portion protruding outwards from the periphery of the iron core main body portion; and the at least one pair of rotor iron core groups are inserted into two axially extending iron core brackets, and the two iron core brackets are each provided with a clamping groove, with openings of the clamping grooves being opposite to each other (i.e. the clamping grooves facing each other).

In one or more embodiments, when the two iron core brackets are sleeved from two ends of the at least one pair of rotor iron core groups, the clamping grooves on the two iron core brackets are clamped on the iron core convex portions of the plurality of rotor iron cores of the at least one pair of rotor iron core groups.

In one or more embodiments, one side of each rotor iron core is provided with at least one first protrusion, and the other side thereof is provided with at least one first groove, and when the plurality of rotor iron cores are stacked, at least one first protrusion on one rotor iron core is correspondingly in embedded fit with at least one first groove on a rotor iron core adjacent thereto.

In one or more embodiments, the clamping groove of each iron core bracket includes two parallel and spaced groove wall plates extending outwards from the main body portion of the iron core bracket, a groove bottom plate is provided between the two groove wall plates, and after the iron core bracket is assembled in place, the groove bottom plate is in abutting fit with a end portion of the corresponding rotor iron core group.

In one or more embodiments, at least one second protrusion and at least one second groove are provided respectively at adjacent end portions of the two iron core brackets, wherein at least one second protrusion at the end portion of one iron core bracket is in corresponding embedded fit with at least one second groove at the adjacent end portion of the other iron core bracket.

In one or more embodiments, the end portion of one iron core bracket has an upper portion provided with a second protrusion and a lower portion provided with a second groove, and the end portion of another adjacent iron core bracket has an upper portion provided with a second groove and a lower portion provided with a second protrusion.

In one or more embodiments, the end portion of one iron core bracket has an upper portion provided with a second protrusion and a second groove, and a lower portion provided with a second groove and a second protrusion, and the end portion of another adjacent iron core bracket has an upper portion correspondingly provided with a second groove and a second protrusion, and a lower portion provided with correspondingly provided with a second protrusion and a second groove in a lower portion.

In one or more embodiments, the at least one second protrusion is a round rod extending in the axial direction, and the at least one second groove is a cylindrical groove extending in the axial direction; and
a suspension end of the round rod is a circular arc end protruding outwards, and an open end of the cylindrical groove is of a flared structure.

In one or more embodiments, the two iron core brackets are each provided with clamping portions arranged at intervals along a circumferential direction and correspondingly fitted with the at least one pair of rotor iron core groups, and two sides of each clamping portion are in abutting fit with two sides of the iron core main body portion of each of the plurality of rotator iron cores.

In one or more embodiments, groove walls of each clamping groove at two sides thereof are each provided with an indentation portion close to a side of a magnetic component, and the indentation portion has an outline consistent with the suspension end of the iron core main body portion; a stopping portion extending outwards is further provided at the bottom of each clamping groove, and the stopping portion is configured to form stopping fit with the rotor iron core located at the outermost.

In one or more embodiments, an outer end portion of the iron core bracket is provided with a coil blocking frame group corresponding to the rotor iron core group, an outer baffle extends outwards from an end portion of the iron core bracket between adjacent coil blocking frame groups, wherein a wire head to be tin-dipped is twisted and then arranged in a space at an inner side of the outer baffle.

In one or more embodiments, the above motor for an electric toothbrush further includes a coil winding wound around each rotor iron core group and fixed in the housing, and a magnetic component fit with the at least one pair of rotor iron core groups.

In one or more embodiments, the above motor for an electric toothbrush further includes a stator iron core group provided at an inner side of the magnetic component and formed by stacking a plurality of stator iron core sheets, and a motor shaft connected to the stator iron core group and rotatably mounted in the housing.

In one or more embodiments, the motor shaft is rotatably mounted in the housing via bearings mounted at two ends of the housing, a soft shaft sleeve is sleeved on the motor shaft at an inner side of the bearing at one end, and a shaft sleeve is sleeved on the motor shaft at an inner side of the bearing at the other end.

In one or more embodiments, the magnetic components each include two magnetic steels with different polarities extending along an axial direction of the motor shaft.

In one or more embodiments, there is a gap between two adjacent magnetic components.

In one or more embodiments, the above motor for an electric toothbrush further includes a motor shaft, wherein the motor shaft has one end rotatably mounted in the housing via a first bearing and the other end connected to a toothbrush shaft which is arranged on am axle centre same as the motor shaft (i.e. being arranged coaxially with the motor shaft), the toothbrush shaft extends out of the housing to connect a brush head; and a second bearing configured to form rotating fit with the housing is sleeved on the toothbrush shaft.

In one or more embodiments, a shaft sleeve is screwed and fixed to one end of the motor shaft adjacent to the toothbrush shaft, and the other end of the shaft sleeve forms screwing fit with the toothbrush shaft.

In one or more embodiments, a soft shaft sleeve is further sleeved on the motor shaft at the inner end of the first bearing.

An embodiment of the present disclosure further provides an electric toothbrush having the above motor for an electric toothbrush.

BRIEF DESCRIPTION OF DRAWINGS

In order to more clearly illustrate technical solutions of embodiments of the present disclosure, drawings which need to be used in the embodiments will be introduced briefly below, and it should be understood that the drawings below merely show some embodiments of the present disclosure, therefore, they should not be considered as limitation on the scope, and a person ordinarily skilled in the art still could obtain other relevant drawings according to these drawings, without using any creative efforts.

Figure 1:
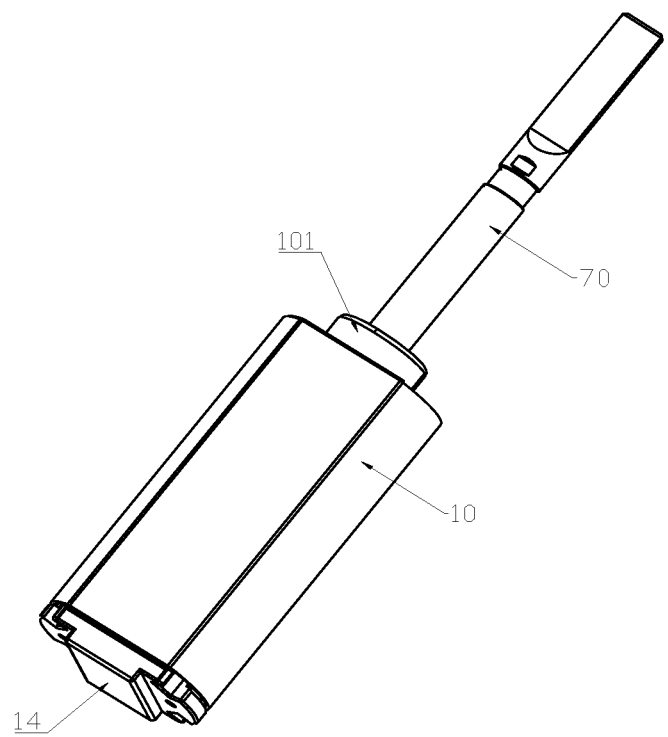
FIG. 1 shows a structural schematic view of a motor for an electric toothbrush provided according to the present disclosure.

Illustration of reference signs in the drawings: 10. housing; 101. bearing chamber; 11. bearing; 12. soft shaft sleeve; 13. shaft sleeve; 14. tail end cover; 20. rotor iron core group; 21. rotor iron core; 211. iron core main body portion; 212. iron core convex portion; 213. first protrusion; 214. first groove; 30. iron core bracket; 31. clamping groove; 311. groove wall plate; 312. groove bottom plate; 32. second protrusion; 33. second groove; 34. circular arc end; 35. clamping portion; 40. coil winding; 50. magnetic component; 51. magnetic steel; 52. gap; 60. stator iron core group; 61. stator iron core sheet; 70. motor shaft (central shaft); 3011. indentation portion; 3012. stopping portion; 302. coil blocking frame group; 303. outer baffle; 501. first bearing; 502. soft shaft sleeve; 600. toothbrush shaft; 601. second bearing; 602. shaft sleeve.

DETAILED DESCRIPTION OF EMBODIMENTS

In order to make the technical means, creative features, achievement goals, and effects realized by the present disclosure to be easily understood, the present disclosure will be further illustrated below with reference to specific drawings.

It should be noted that in the present disclosure, when an element is "fixed" on another element, it may be directly on the another element or there may be an intermediate element therebetween. When an element is considered to be "connected to" another element, it may be directly connected to the another element or there may be an intermediate element therebetween. Terms used herein such as "perpendicular", "horizontal", "left", "right", and the similar description are merely for illustrative purpose, rather than representing a unique embodiment.

Unless otherwise defined, all of the technical and scientific terms used herein have the same meanings as those generally understood by a person skilled in the art of the present disclosure. Terms used herein in the description of the present disclosure are only for the purpose of describing specific embodiments, rather than limiting the present disclosure. The wordings "and/or" used herein include any or all combinations of one or more associated items listed.

Regarding a motor for an electric toothbrush provided in the present disclosure, by providing an iron core bracket for fixing a rotor iron core group of a split structure to be in an integrated structure in a circumferential direction, and providing a structure of splicing two iron core brackets in an axial direction, in an actual assembling process, the rotor iron core groups of a split structure can be conveniently assembled and fixed by making the iron core brackets respectively sleeved from two ends of the rotor iron core group, significantly improving the assembling efficiency of the motor for an electric toothbrush, and ensuring the rotor iron core group to be assembled in place.

Regarding the motor for an electric toothbrush provided in the present disclosure, by optimizing and improving the structure of the iron core brackets, and forming stopping limit for the rotor iron cores through clamping grooves provided on the iron core brackets and indentation portions provided on groove walls of the clamping grooves, the problem of scratching the coil winding in the use process caused by scratching the coil winding wound around the iron core in the current clamping method is avoided, thus ensuring the use reliability of the motor for an electric toothbrush after the assembling is completed, and further improving the efficiency of the tin dipping process.

The present disclosure provides a motor for an electric toothbrush, including a housing 10 and at least one pair of rotor iron core groups 20 fixed within the housing 10, wherein each rotor iron core group 20 is formed by stacking a plurality of rotor iron cores 21, each of the plurality of rotor iron cores 21 includes an iron core main body portion 211 and an iron core convex portion 212 protruding outwards from the periphery of the iron core main body portion 211; at least one pair of rotor iron core groups 20 are inserted into two axially extending iron core brackets 30, and the two iron core brackets 30 are each provided with a clamping groove 31, with the clamping grooves having openings opposite to each other. The clamping grooves 31 can limit the iron core convex portions 212 of the rotor iron core, thus improving the assembling accuracy of the motor for an electric toothbrush.

Figure 2:
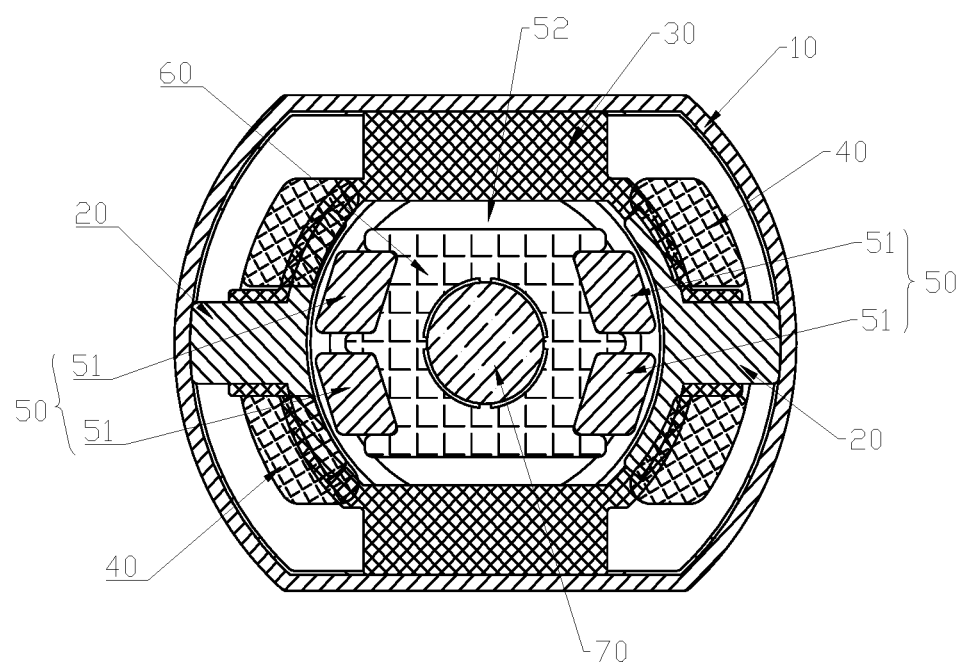
FIG. 2 shows a radial sectional view of the motor for an electric toothbrush in the present disclosure.

In one or more embodiments, with reference to what is shown in FIGS. 1 and 2, the present disclosure provides a motor for an electric toothbrush, including a housing 10, wherein at least one pair of rotor iron core groups 20 are fixed within the housing 10, each rotor iron core group 20 is formed by stacking a plurality of rotor iron cores 21, each rotor iron core 21 includes an iron core main body portion 211 and an iron core convex portion 212 protruding outwards from the periphery of the iron core main body portion 211; and the at least one pair of rotor iron core groups 20 are inserted into two iron core brackets 30 extending in the axial direction, the two iron core brackets 30 are each provided with a clamping groove 31, with the clamping grooves having openings opposite to each other, and when the two iron core brackets 30 are sleeved from two ends of the rotor iron core group 20, the clamping grooves 31 on the iron core brackets 30 are clamped on the iron core convex portions 212 of the rotor iron core 21.

Figure 6:
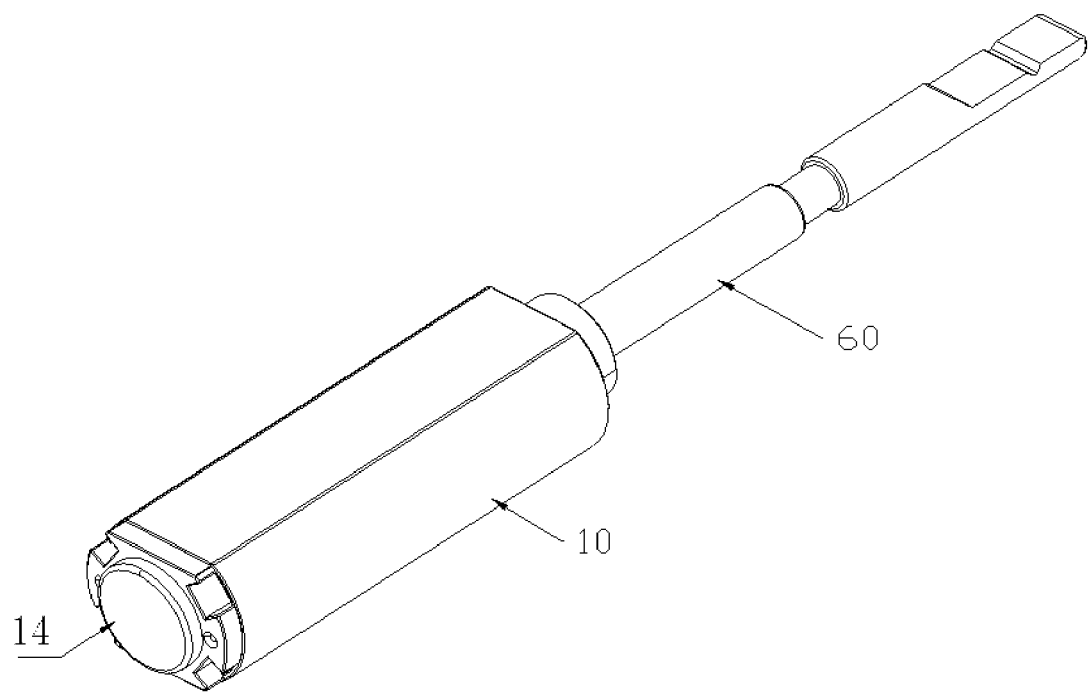
FIG. 6 shows a structural schematic view of another motor for an electric toothbrush provided according to the present disclosure.
Figure 7:
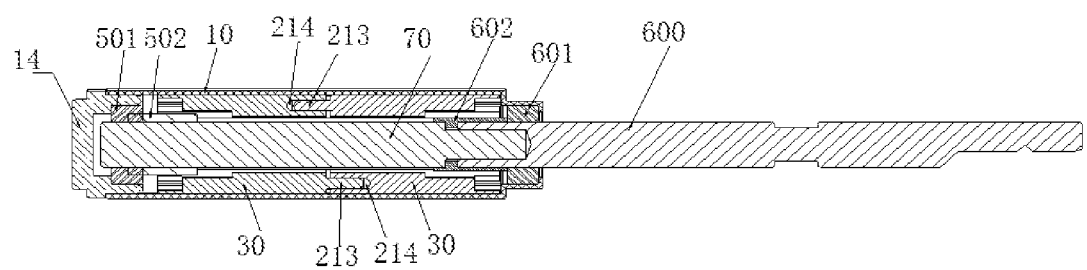
FIG. 7 shows a circumferential sectional view of the motor for an electric toothbrush in FIG. 6.
Figure 8:
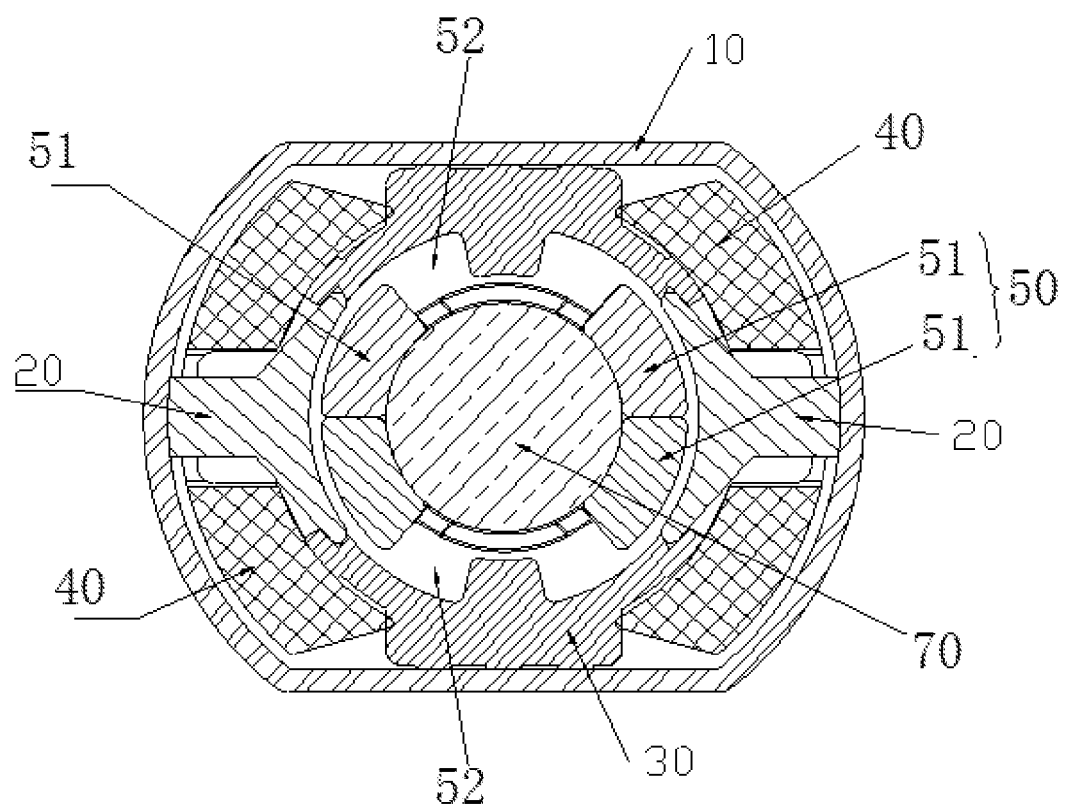
FIG. 8 shows a radial sectional view of the motor for an electric toothbrush in FIG. 6.

In one or more embodiments, as shown in FIGS. 6, 7, and 8, the present disclosure provides a motor for an electric toothbrush, including a housing 10 and at least one pair of rotor iron core groups 20 fixed within the housing 10, wherein each rotor iron core group 20 is formed by stacking a plurality of rotor iron cores 21, each rotor iron core 21 includes an iron core main body portion 211 and an iron core convex portion 212 protruding outwards from the periphery of the iron core main body portion 211, at least one pair of rotor iron core groups 20 are inserted into two axially extending iron core brackets 30, and the two iron core brackets 30 are each provided with a clamping groove 31, with the clamping grooves having openings opposite to each other. Groove walls of each clamping groove 31 at two sides thereof are each provided with an indentation portion 3011 close to a side of a magnetic component 50, and the indentation portion 3011 has an outline consistent with a suspension end of the iron core main body portion 211; and a stopping portion 3012 extending outwards is further provided at the bottom of each clamping groove 31 and forms stopping fit with the rotor iron core 21 located at the outermost.

In the technical solution provided in the present disclosure, by optimizing and improving the structure of the iron core brackets 30, and forming stopping limit for the rotor iron cores 21 through the clamping grooves 31 provided on the iron core brackets 30 and the indentation portions 3011 provided on the groove walls of the clamping grooves 31, scratching of the coil winding 40 wound around the rotor iron core 21 in the current clamping mode is avoided, thus ensuring the use reliability of the motor for an electric toothbrush after the assembling is completed.

Further, in one or more embodiments, an outer end portion of each iron core bracket 30 is provided with a coil blocking frame group 302 corresponding to the rotor iron core group 20, an outer baffle 303 extends outwards from an end portion of each iron core bracket 30 between adjacent coil blocking frame groups 302, and a wire head to be tin-dipped is twisted and then arranged in a space at the inner side of the outer baffle 303.

Based on the structure of existing motors for an electric toothbrush, the coil needs to be subjected to a tin-dipping operation first, then the wire is arranged, and then tucked into a pre-set cavity at an end portion of the iron core bracket 30 so as to realize fixation, but this easily causes damage to the tin-dipped portion; in view of this, in the present disclosure, the outer baffle 303 extending outwards is provided at the end portion of the iron core bracket 30 between adjacent coil blocking frame groups 302, the wire head to be tin-dipped is twisted and then arranged in the space at the inner side of the outer baffle 303, and then the tin-dipping operation is performed, in this way, the reliability of the tin-dipped position is ensured.

Figure 5:
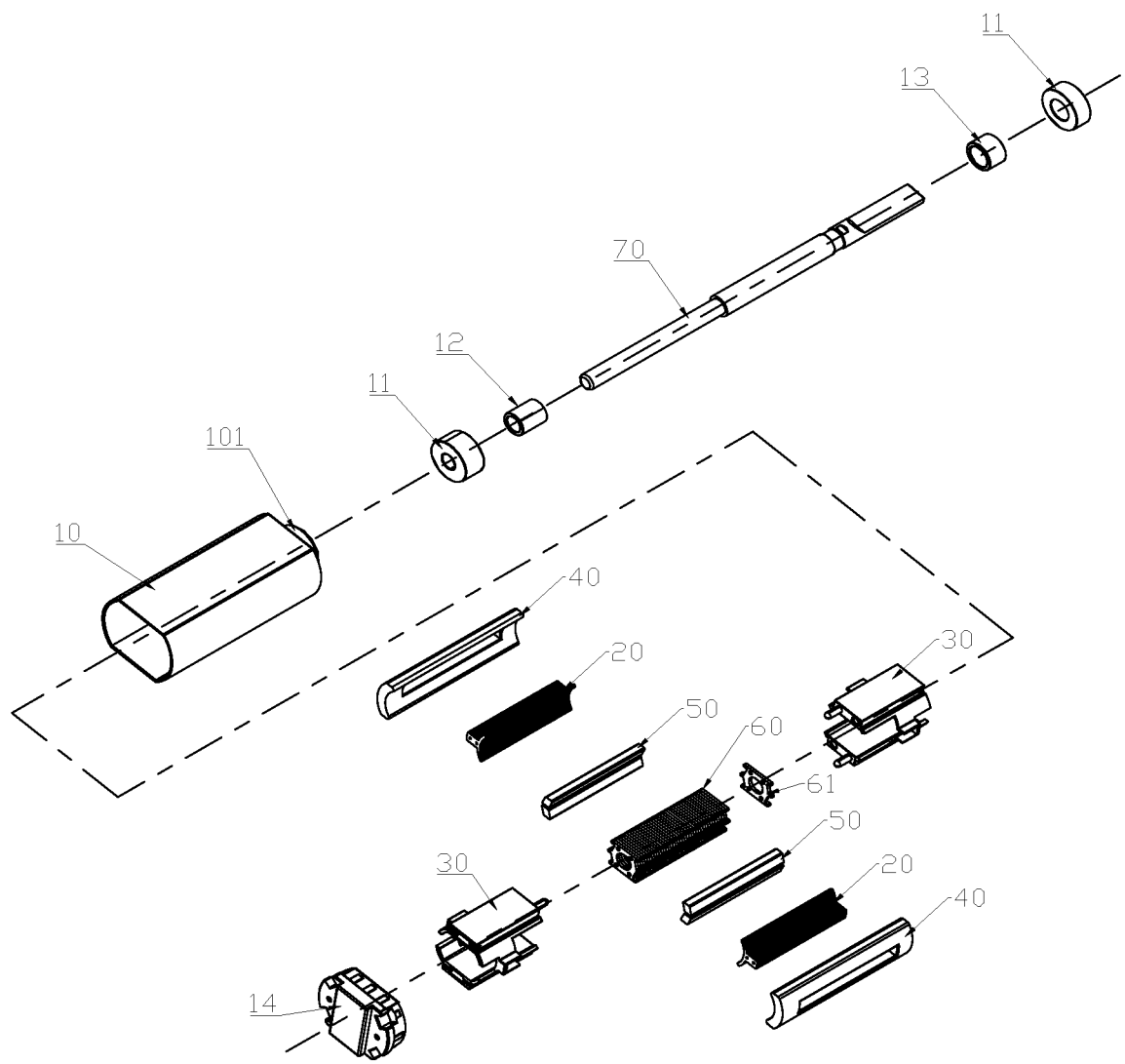
FIG. 5 shows an exploded schematic view of a motor for an electric toothbrush provided according to the present disclosure.

In one or more embodiments of the present disclosure, with reference to what is shown in FIGS. 2 and 5, the motor for an electric toothbrush provided in the present disclosure further includes a coil winding 40 wound around each rotor iron core group 20 and fixed in the housing 10, magnetic components 50 fit with individual rotor iron core groups 20, a stator iron core group 60 provided at an inner side of the magnetic component 50 and formed by stacking a plurality of stator iron core sheets 61, and a motor shaft 70 connected to the stator iron core group 60 and rotatably mounted in the housing 10. In the above, each magnetic component 50 includes two magnetic steels 51 with different polarities, and the two magnetic steels 51 forming each magnetic component 50 are arranged in a manner of extending along an axial direction of the motor shaft 70, and there is a gap 52 between two adjacent magnetic components 50. The motor shaft 70 is rotatably mounted in the housing 10 via bearings 11 mounted at two ends of the housing 10, a soft shaft sleeve 12 is sleeved on the motor shaft 70 at an inner side of the bearing 11 at one end, and a shaft sleeve 13 is sleeved on the motor shaft 70 at an inner side of the bearing 11 at the other end; in the above, the soft shaft sleeve 12 is made of a soft plastic material, specifically such as graphite nylon or Teflon material. By providing the soft shaft sleeve 12, when the motor shaft 70 performs an axial or circumferential reciprocating movement, a soft shaft sleeve body can automatically adapt to the movement of the motor shaft 70, causing small noise during the operation of the motor, and achieving a certain lubrication effect, so that the service lifetime of the motor shaft 70 is longer.

In one or more embodiments, with reference to what is shown in FIGS. 8 and 11, the motor for an electric toothbrush further includes a motor shaft 70, a coil winding 40 wound around each rotor iron core group 20 and fixed in the housing 10, and magnetic components 50 fit with individual rotor iron core groups 20. Each magnetic component 50 includes two magnetic steels 51 with different polarities, and the two magnetic steels 51 forming the each magnetic component 50 are arranged in a manner of extending along the axial direction of the motor shaft 70, and there is a gap 52 between two adjacent magnetic components 50. The motor shaft 70 has one end rotatably mounted in the housing 10 via a first bearing 501, and the other end connected to a toothbrush shaft 600 which is arranged on am axle centre same as the motor shaft, and the toothbrush shaft 600 extends out of the housing 10 to connect a brush head; and a second bearing 601 is sleeved on the toothbrush shaft 600 and forms rotating fit with the housing 10. In this embodiment, by changing one shaft in the prior art to obtain cooperation between the motor shaft 70 and the toothbrush shaft 600, the specification and dimension of the toothbrush shaft 600 are changed without changing the motor shaft 70, further meeting design requirements of motors for an electric toothbrush of different specifications and types, and further realizing the universality of the toothbrush shaft. Preferably, as a specific connection manner between the toothbrush shaft 600 and the motor shaft 70, a shaft sleeve 602 is screwed and fixed to one end of the motor shaft 70 adjacent to/near the toothbrush shaft 600, and the other end of the shaft sleeve 602 forms screwing fit with the toothbrush shaft 600. Further, in one or more embodiments, a soft shaft sleeve 502 is further sleeved on the motor shaft 70 at the inner end of the first bearing 501. Specifically, the soft shaft sleeve 502 is made of a soft plastic material, specifically a graphite nylon material or a Teflon material. By providing the soft shaft sleeve 502, when the motor shaft 70 performs an axial or circumferential reciprocating movement, a soft shaft sleeve body can automatically adapt to the movement of the motor shaft 70, causing small noise during the operation of the motor, and achieving a certain lubrication effect, so that the service lifetime of the motor shaft 70 is longer. In a specific embodiment of the present disclosure, with reference to what is shown in FIGS. 8 and 11, the housing 10 of the motor for an electric toothbrush of the present disclosure is open at one end, and has a tubular shell of an integrated structure at the other end. In the above, one side of the integrated structure protrudes outwards to form a bearing chamber for accommodating the second bearing 601, and a through via hole is provided at the center of the integrated structure for allowing the toothbrush shaft 600 to extend out, a tail end cover 14 is provided at the open end of the housing 10, and the tail end cover 14 is fixed to the open end of the housing 10 by means of snap-riveting.

In a specific embodiment of the present disclosure, with reference to what is shown in FIG. 5, the housing 10 is open at one end, and has a tubular shell of an integrated end cover structure at the other end, one side of the integrated end cover structure protrudes outwards to form a bearing chamber 101 for accommodating the bearing 11, and a through via hole is provided at the center of the integrated end cover for allowing the motor shaft 70 to extend out, a tail end cover 14 is provided at the open end of the housing 10, and the tail end cover 14 is fixed to the open end of the housing 10 by means of snap-connection.

In the technical solution provided in the present disclosure, by providing the iron core bracket 30 for fixing the rotor iron core group 20 of a split type structure to be in an integrated structure in the circumferential direction, and providing a structure of splicing two iron core brackets 30 in an axial direction, in an actual assembling process, the rotor iron core groups 20 of a split structure can be conveniently assembled and fixed by making the iron core brackets 30 respectively sleeved from two ends of the rotor iron core groups 20, significantly improving the assembling efficiency, and ensuring the rotor iron core groups to be assembled in place.

Figure 4:
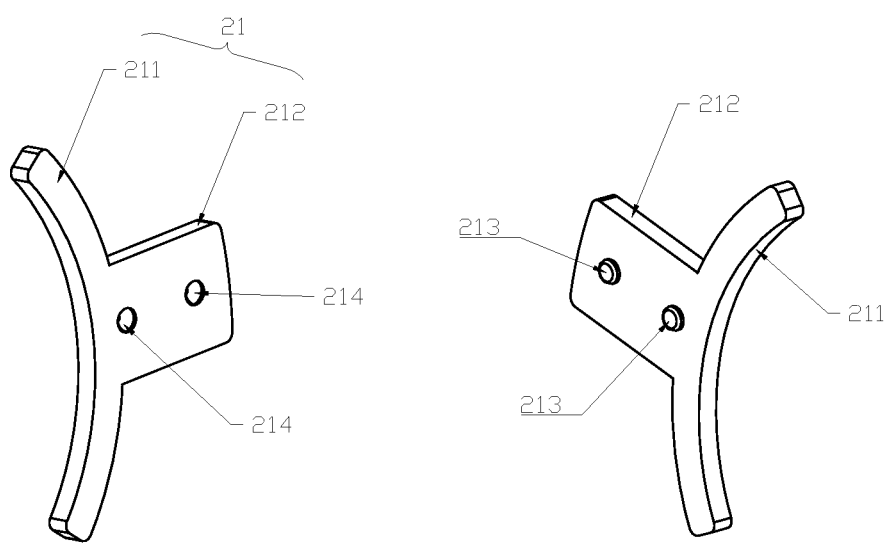
FIG. 4 shows a structural schematic view of a rotor iron core in the present disclosure.

Further, in one or more embodiments, the rotor iron core group 20 is formed by stacking a plurality of rotor iron cores 21. As a specific embodiment of stacking a plurality of rotor iron cores 21 to form a rotor iron core group 20, with reference to what is shown in FIG. 4, one side of the rotor iron core 21 is provided with a first protrusion 213, and the other side is provided with a first groove 214, and when the rotor iron cores 21 are stacked, the first protrusion 213 on one rotor iron core 21 is in embedded fit with the first groove 214 on the rotor iron core 21 adjacent thereto. More specifically, the first protrusion 213 and the first groove 214 are both provided on the iron core main body portion 211 of the rotor iron core 21, and further preferably, two first protrusions 213 are arranged at intervals. By providing the first protrusion 213 and the first groove 214 on the rotor iron core 21, a certain pre-fixing function can be achieved during stacking and mounting, ensuring assembling accuracy and assembling efficiency.

Figure 3:
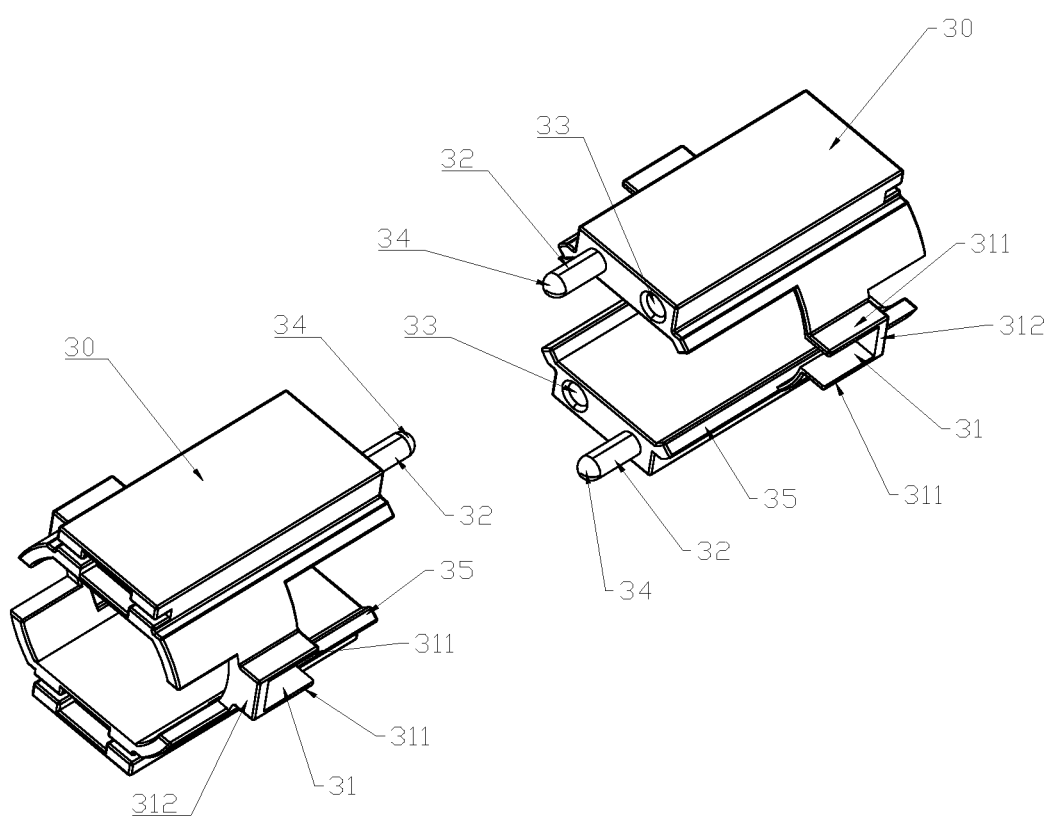
FIG. 3 shows a structural schematic view of an iron core bracket in the present disclosure.

In one or more embodiments, with reference to what is shown in FIG. 3, each clamping groove 31 includes two parallel and spaced groove wall plates 311 extending outwards from the main body portion of the iron core bracket 30, a groove bottom plate 312 is provided between the two groove wall plates 311, and after the iron core bracket 30 is assembled in place, the groove bottom plate 312 is in abutting fit with the end portion of the rotor iron core group 20. By means of the structural design of the clamping grooves 31, the iron core convex portions 212 of the rotor iron cores 21 are limited by the groove wall plates 311 at two sides, and the end portions of the rotor iron core group 20 are limited and restrained by the groove bottom plate 312 of the clamping groove 31, improving the assembling accuracy.

Figure 9:
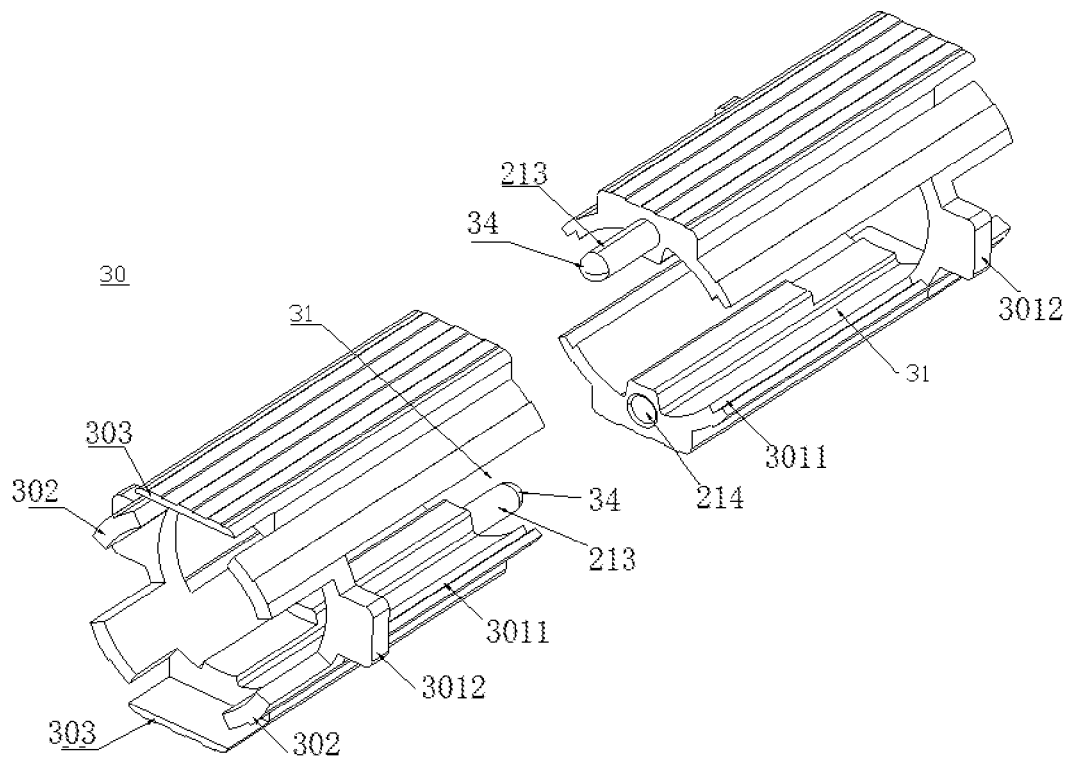
FIG. 9 shows a structural schematic view of another iron core bracket provided according to the present disclosure.
Figure 10:
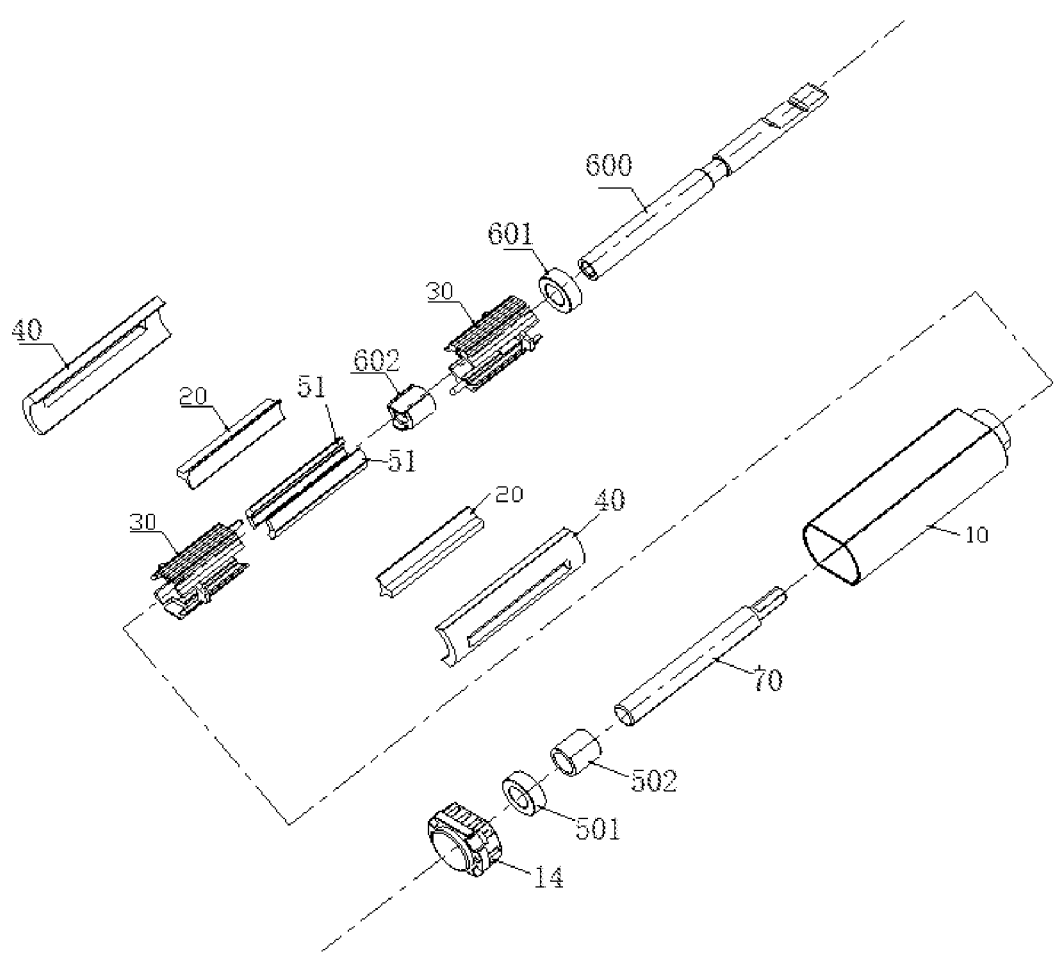
FIG. 10 shows an exploded schematic view of another motor for an electric toothbrush provided according to the present disclosure.

In one or more embodiments, with reference to what is shown in FIGS. 3 and 9, as a specific embodiment of splicing two iron core brackets 30, at least one second protrusion 32 and at least one second groove 33 are provided at adjacent end portions of the two iron core brackets 30, wherein the second protrusion 32 at an end portion of one iron core bracket 30 is in embedded fit with the second groove 33 at an end portion of the adjacent iron core bracket 30. More preferably, in a specific embodiment of the present disclosure, the second protrusion 32 is a round rod extending in the axial direction, and the second groove 33 is a cylindrical groove extending in the axial direction; and a suspension end of the round rod is a circular arc end 34 protruding outwards, and the open end of the cylindrical groove is of a flared structure. In this way, the circular arc end 34 of the round rod can be more easily inserted into the cylindrical groove body in the flared structure, thus realizing the embedded fit.

Preferably, as shown in FIG. 9, the end portion of one iron core bracket 30 has an upper portion provided with a second protrusion 32, and a lower portion provided with a second groove 33, and the end portion of another adjacent iron core bracket 30 has an upper portion provided with a second groove 33, and a lower portion provided with a second protrusion 32 in a lower portion.

More preferably, as shown in FIG. 3, the end portion of one iron core bracket 30 has the upper portion provided with a second protrusion 32 and a second groove 33, and the lower portion provided with a second groove 33 and a second protrusion 32, and the end portion of another adjacent iron core bracket has the upper portion correspondingly provided with a second groove 33 and a second protrusion 32, and the lower portion correspondingly provided with a second protrusion 32 and a second groove 33.

In one or more embodiments, the iron core bracket 30 is provided with clamping portions 35 arranged at intervals along the circumferential direction and correspondingly fitted with the rotor iron core groups 20, and two sides of each clamping portion 35 are in abutting fit with two sides of the iron core main body portion 211. Through the design of the clamping portions 35, the position of the rotator iron core 21 is further limited, ensuring the assembling accuracy.

The basic principle of the present disclosure, main features, and characteristics of the present disclosure are shown and described in the above. A person skilled in the art should understand that the present disclosure is not limited by the above embodiments, the above embodiments and the description in the specification merely describe the principle of the present disclosure, various changes and improvements could be further made to the present disclosure without departing from the spirit and scope of the present disclosure, and all of these changes and improvements fall within the scope claimed in the present disclosure. The scope of protection claimed in the present disclosure is delimitated by the claims attached and equivalents thereof.

INDUSTRIAL APPLICABILITY

The motor for an electric toothbrush provided in the present disclosure includes a housing and at least one pair of rotor iron core groups fixed within the housing, wherein each rotor iron core group is formed by stacking a plurality of rotor iron cores, each of the plurality of rotor iron cores includes an iron core main body portion and an iron core convex portion protruding outwards from the periphery of the iron core main body portion; at least one pair of rotor iron core groups are inserted into two axially extending iron core brackets, and the two iron core brackets are each provided with a clamping groove, with the clamping grooves having openings opposite to each other. The motor for an electric toothbrush provided in the present disclosure can conveniently assemble and fix the rotor iron core groups of a split structure, significantly improve the assembling efficiency of the motor for an electric toothbrush, and ensure the rotor iron core group to be the assembled in place. The motor for an electric toothbrush provided in the present disclosure can avoid the problem of scratching the coil winding in the use process caused by scratching the coil winding wound around the iron core by the current clamping method, thus ensuring the use reliability of the motor for an electric toothbrush after the assembling is completed, and further improving the efficiency of the tin dipping process.

What is claimed is:

1. A motor for an electric toothbrush, comprising a housing and at least one pair of rotor iron core groups fixed within the housing, wherein each rotor iron core group is formed by stacking a plurality of rotor iron cores, each of the plurality of rotor iron cores comprises an iron core main body portion and an iron core convex portion protruding outwards from a periphery of the iron core main body portion; and the at least one pair of rotor iron core groups are inserted into two axially extending iron core brackets, and the two iron core brackets are each provided with a clamping groove, with openings of the clamping grooves being opposite to each other.

2. The motor for an electric toothbrush according to claim 1, wherein when the two iron core brackets are sleeved from two ends of the at least one pair of rotor iron core groups, the clamping grooves on the two iron core brackets are clamped on the iron core convex portions of the plurality of rotor iron cores of the at least one pair of rotor iron core groups.

3. The motor for an electric toothbrush according to claim 2, wherein each rotor iron core has one side provided with at least one first protrusion, and the other side provided with at least one first groove, wherein when the plurality of rotor iron cores are stacked, at least one first protrusion on one rotor iron core is correspondingly in embedded fit with at least one first groove on a rotor iron core adjacent thereto.

4. The motor for an electric toothbrush according to claim 1, wherein the clamping groove of each iron core bracket comprises two parallel and spaced groove wall plates extending outwards from a main body portion of the iron core bracket, a groove bottom plate is provided between the two groove wall plates, and the groove bottom plate is configured to be in abutting fit with an end portion of the corresponding rotor iron core group after the iron core bracket is assembled in place.

5. The motor for an electric toothbrush according to claim 1, wherein at least one second protrusion and at least one second groove are provided respectively at end portions of the two iron core brackets adjacent to each other, wherein at least one second protrusion at the end portion of one iron core bracket is in corresponding embedded fit with at least one second groove at the adjacent end portion of the other iron core bracket.

6. The motor for an electric toothbrush according to claim 5, wherein the end portion of one iron core bracket has an upper portion provided with one second protrusion and a lower portion provided with one second groove, and the end portion of another adjacent iron core bracket has an upper portion provided with one second groove and a lower portion provided with one second protrusion.

7. The motor for an electric toothbrush according to claim 5, wherein the end portion of one iron core bracket has an upper portion provided with one second protrusion and one second groove, and a lower portion provided with one second groove and one second protrusion, and the end portion of another adjacent iron core bracket has an upper portion correspondingly provided with one second groove and one second protrusion, and a lower portion correspondingly provided with one second protrusion and one second groove.

8. The motor for an electric toothbrush according to claim 5, wherein the at least one second protrusion is a round rod extending in an axial direction, and the at least one second groove is a cylindrical groove extending in the axial direction; and a suspension end of the round rod is a circular arc end protruding outwards, and an open end of the cylindrical groove is of a flared structure.

9. The motor for an electric toothbrush according to claim 1, wherein the two iron core brackets are each provided with clamping portions arranged at intervals along a circumferential direction and correspondingly fitted with the at least one pair of rotor iron core groups, and two sides of each clamping portion are in abutting fit with two sides of the iron core main body portion of each of the plurality of rotator iron cores.

10. The motor for an electric toothbrush according to claim 1, wherein groove walls of each clamping groove at two sides thereof are each provided with an indentation portion close to a side of a magnetic component, and the indentation portion has an outline consistent with a suspension end of the iron core main body portion; and a stopping portion extending outwards is further provided at a bottom of each clamping groove, and the stopping portion is configured to form stopping fit with a rotor iron core located at the outermost.

11. The motor for an electric toothbrush according to claim 1, wherein an outer end portion of the iron core bracket is provided with a coil blocking frame group corresponding to the rotor iron core group, an outer baffle extends outwards from an end portion of the iron core bracket between adjacent coil blocking frame groups, wherein a wire head to be tin-dipped is twisted and then arranged in a space at an inner side of the outer baffle.

12. The motor for an electric toothbrush according to claim 1, further comprising a coil winding wound around each rotor iron core group and fixed in the housing, and a magnetic component fit with the at least one pair of rotor iron core groups.

13. The motor for an electric toothbrush according to claim 12, further comprising a stator iron core group provided inside the magnetic component and formed by stacking a plurality of stator iron core sheets, and a motor shaft connected to the stator iron core group and rotatably mounted in the housing.

14. The motor for an electric toothbrush according to claim 13, wherein the motor shaft is rotatably mounted in the housing via bearings mounted at two ends of the housing, a soft shaft sleeve is sleeved on the motor shaft at an inner side of the bearing at one end, and a shaft sleeve is sleeved on the motor shaft at an inner side of the bearing at the other end.

15. The motor for an electric toothbrush according to claim 12, wherein the magnetic components each comprise two magnetic steels with different polarities and extending in an axial direction of the motor shaft.

16. The motor for an electric toothbrush according to claim 12, wherein a gap is formed between two adjacent magnetic components.

17. The motor for an electric toothbrush according to claim 1, further comprising a motor shaft, wherein the motor shaft has one end rotatably mounted in the housing via a first bearing and the other end connected to a toothbrush shaft which is arranged on an axle centre same as the motor shaft, the toothbrush shaft extends out of the housing to connect a brush head; and a second bearing configured to form rotating fit with the housing is sleeved on the toothbrush shaft.

18. The motor for an electric toothbrush according to claim 17, wherein a shaft sleeve is screwed and fixed to one end of the motor shaft adjacent to the toothbrush shaft, and the other end of the shaft sleeve forms screwing fit with the toothbrush shaft.

19. The motor for an electric toothbrush according to claim 17, wherein a soft shaft sleeve is further sleeved on the motor shaft at an inner end of the first bearing.

20. An electric toothbrush, wherein the electric toothbrush has the motor for an electric toothbrush according to claim 1.

* * * * *